(12) United States Patent
Chongtoua et al.

(10) Patent No.: US 8,708,381 B2
(45) Date of Patent: Apr. 29, 2014

(54) MULTIFUNCTIONAL PACKAGING CONTAINER AND METHODS OF USE THEREOF

(76) Inventors: Vangyi Chongtoua, Parker, CO (US); Phoumaly Chongtoua, Parker, CO (US)

( * ) Notice: Subject to any disclaimer, the term of this patent is extended or adjusted under 35 U.S.C. 154(b) by 443 days.

(21) Appl. No.: 13/114,544

(22) Filed: May 24, 2011

(65) Prior Publication Data

US 2011/0289024 A1 Nov. 24, 2011

Related U.S. Application Data

(60) Provisional application No. 61/347,769, filed on May 24, 2010.

(51) Int. Cl.
*A01K 29/00* (2006.01)
*E01H 1/12* (2006.01)

(52) U.S. Cl.
USPC .............................. 294/1.3; 294/25; 15/257.6

(58) Field of Classification Search
USPC ................ 294/1.3, 1.4, 1.5, 25, 55; 15/257.1, 15/257.6; 229/117.01, 117.03, 117.09, 229/117.12
See application file for complete search history.

(56) References Cited

U.S. PATENT DOCUMENTS

| | | | |
|---|---|---|---|
| 3,685,088 A * | 8/1972 | Doherty | 294/1.3 |
| 4,974,893 A | 12/1990 | Grahn | |
| 5,186,384 A | 2/1993 | Nelson | |
| 5,522,628 A | 6/1996 | Fillis | |
| 5,564,762 A | 10/1996 | Ring | |
| D386,840 S | 11/1997 | Sturm | |
| 5,829,671 A | 11/1998 | Hawk | |
| 5,964,488 A * | 10/1999 | Bedel | 294/1.3 |
| D417,042 S | 11/1999 | Hodges, Jr. et al. | |
| D418,261 S | 12/1999 | Betts et al. | |
| 6,932,399 B2 * | 8/2005 | Fonfrias | 294/1.3 |
| 7,976,083 B2 * | 7/2011 | Black et al. | 294/1.3 |

* cited by examiner

*Primary Examiner* — Paul T Chin
(74) *Attorney, Agent, or Firm* — Leyendecker & Lemire, LLC

(57) ABSTRACT

Multifunctional packaging containers and methods of use are disclosed. An exemplary container typically comprises a body section having a generally flat rectangular shape when in a flattened configuration. The container transforms into a generally elongated cylindrical shape when in the closed configuration. The exemplary container also comprises a first and second side wall. A handle assembly may also be included. Additionally, the container typically includes one or more securing mechanisms adapted to lock the contents therein. Methods of using the container include using it as a disposable pet waste scooper or general storage compartment.

20 Claims, 10 Drawing Sheets

MULTIFUNCTIONAL PACKAGING CONTAINER AND METHODS OF USE THEREOF

CROSS-REFERENCE TO RELATED APPLICATIONS

This application is a nonprovisional patent application of and claims priority to U.S. provisional patent application No. 61/347,769 filed May 24, 2010. The aforementioned provisional patent application has the same title and named inventors as the present application.

FIELD OF THE INVENTION

The present invention relates generally to packaging containers. More particularly, the present invention relates to specialized packaging containers having a plurality of functions and uses.

BACKGROUND

Package containers are utilized various purposes such as food storage and preservation. One of many types of food storage and preservation includes pet food. The number of pet owners in the United States surpassed the 70 million mark and is still increasing. Moreover, the number of pet owners in other developed countries is also significant respective to their population. Hence, pet food demands as well as the storage, transportation and preservation thereof are significantly increasing. As a result, the pet food industry also induces a huge carbon footprint for their packaging container solutions.

Another problem results from the increased number of pets owned by persons in the United Stated and throughout the world. Pet waste in cities around the world, particularly in dense urban populations, has become a huge and serious problem that puts more stress to our already fragile environment. Most cities have ordinance for pet waste cleaning, and also in the recent years pet owners have become more conscious and responsible when walking their dogs in public places. The demand of pet waste products has spurred a response from the pet industry. Thus, some vendors offer basic solution such as a simple thin plastic pick up bag that can be used to cover the hand as a protective barrier against the pet waste. This is a very unpleasant solution and does not solve some of the important problems with disposal of pet waste. Hence, prior art solutions lack effectiveness and appeal to many pet owners.

Moreover, other products and methods of removing pet waste depend on hardware devices or the like that are neither portable nor practical for outdoor walks. Yet other alternative approaches to removing pet waste include solutions consist of shifting the problem such as picking and flushing pet waste plastic bags into our sewage system draining more of our scarce water resource and causing more biological hazard to our environment. Heretofore, problems relating to removing pet waste still remain, such as but not limited to: disposal creates an unpleasant feel, touch, and smell of pet waste while scooping and disposing it. Coupled with the problem of the huge carbon footprint created by packaging container solutions and a viable solution is needed for pet waste disposal to meet the needs of pet owners, pet food producers, and environmentally conscious community and city planners.

DETAILED DESCRIPTION

Figure 1:
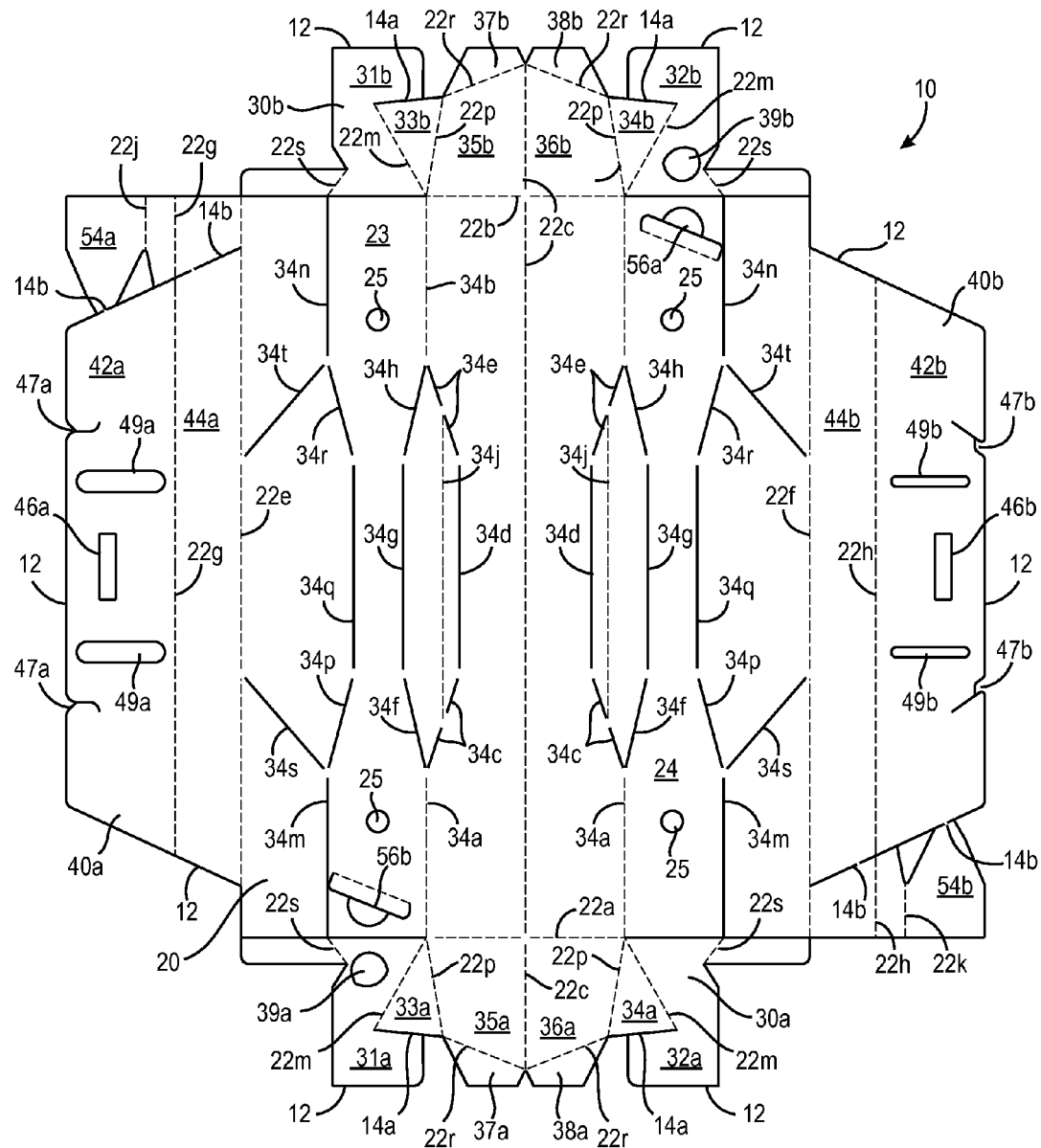
FIG. 1 is a plan view of a multifunctional packaging container according to an embodiment.

Embodiments of the present invention comprise multifunctional packaging containers and their methods of use. Embodiments of the multifunctional packaging container comprise a unique solution incorporating pet food packaging and pet waste pick-up requirements. It is to be appreciated, however, that some embodiments of the multifunctional packaging container also address the needs of various consumable and non-consumable good packaging requirements. It will become apparent that embodiments of the multifunctional packaging container provide solutions to these various problems, particularly those related to the pet waste management problems, set themselves apart comprehensively, functionally, aesthetically, and ecologically from the existing products in the market.

Embodiments of the multifunctional packaging container provide a comprehensive solution to a major part of the consumable goods market, particularly to pet food packaging challenges and the pet waste cleanup problems. The multifunctional packaging container can be comprised of paperboard and formed into a generally polygon or pentagon-like elongated container when transformed into a closed configuration. The multifunctional packaging container can also be collapsed into a flattened configuration. When the multifunctional packaging container is in an open configuration (i.e., between the flattened configuration and the closed configuration, is can be generally folded in half to change the size of the opening while providing at least some biasing or springing action against a force of a user closing the opening thereof. Hence, the multifunctional packaging container can be used first for packaging pet food or another good, and second as a scooper to pick-up and dispose of pet waste.

Moreover, embodiments of the multifunctional packaging container can include a printed advertisement on a surface thereof.

In use, a pet food manufacturer can place a measurable and suitable quantity of food into the multifunctional packaging container. The multifunctional packaging container is then sealed and shipped in lot to a designated store. Consumers gain access to the pet food by opening the container in a non destructive manner. Self explanatory instructions are printed on the outer surface of the multifunctional packaging container. The container is then re-folded into its collapsible or flattened configuration. Alternatively, the multifunctional packaging container can be sold in bulk in the flattened or near flattened condition. The multifunctional packaging container can then be stored until the consumer is ready to use it as a disposable pet waste scooper.

An objective of the multifunctional packaging container is to offer a solution that minimizes the packaging industry's carbon footprint with respect to packages for the pet industry as well as reduce the undesired effects of pet waste cleanup by providing a better method of pick-up and disposal. Hence, the paperboard or other material from which embodiments of the multifunctional packaging container are constructed is typically comprised of both standard and biodegradable materials as well as other suitable renewable resources and materials comprised thereof.

In sum, embodiments of the multifunctional packaging container provide a plurality of functional uses while helping to alleviate the littering of petrochemical products to landfills and sewage system. Consequently, embodiments of the multifunctional packaging container reduce the carbon footprint dramatically in the consumable good industry, particularly when used in the context of the pet food industry, as well as meet the needs of discerning pet owners.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning: either or both.

References in the specification to "one embodiment", "an embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

The term "removable," "removably coupled," "readily removable," "threadably coupled," and similar terms, as used in this specification and appended claims, refer to structures that can be uncoupled from an adjoining structure with relative ease (i.e., non-destructively and without complicated or time consuming process), and can also be readily reattached or coupled to the previously adjoining structure.

Directional and/or relationary terms such as, but not limited to, left, right, top, bottom, vertical, horizontal, back, front and lateral are relative to each other and are dependent on the specific orientation of an applicable element or article, and are used accordingly to aid in the description of the various embodiments and are not necessarily intended to be construed as limiting.

As applicable, the terms "about" and "generally" as used herein unless otherwise indicated mean a margin of +−20%. Also, as applicable, the term "substantially" as used herein unless otherwise indicated means a margin of +−10%. Concerning angular measurements, "about" or "generally" refer to +−10 degrees and "substantially" refers to +−5.0 degrees unless otherwise indicated. It is to be appreciated that not all uses of the above terms are quantifiable such that the referenced ranges can be applied.

An Exemplary Embodiment of a Multifunctional Packaging Container

An exemplary embodiment of a multifunctional packaging container 10 is illustrated in FIGS. 1 through 9. A detailed description of the various cut and fold lines, as well as the various sections and portions of the multifunctional packaging container 10 is provided in FIG. 1. The container 10 typically comprises several portions or regions that define the overall shape and structure of the container 10. In general, the container 10 typically comprises a body section 20, a first side wall 30a, a second side wall 30b, and a handle assembly having a handle first portion 40a and a handle second portion 40b. Additionally, the container 10 typically includes one or more securing mechanisms. It is to be appreciated that some of these portions or regions may not be included in some embodiments of the multifunctional packaging container. For example, in one embodiment, the container may only include one handle assembly portion while other embodiments may not include any handle assembly at all.

As illustrated in FIG. 1, the container 10 can be made from a single sheet of paperboard or the like. A perimeter cut line 12 on the single sheet of paperboard can be executed to create the structure of the container 10. The cut line 12 extends completely around the perimeter of the shape drawn in FIG. 1. This is particularly pertinent when the container is either cut by a machine press or the like; or when it is integrated into a substantially flat wall of another structure like a cardboard cereal box, for instance, and must be cut out by a user. However, in some implementations, the container 10 can be provided with the first and second side walls 30a, 30b folded inwardly having a portion of each fastened to a portion of the body section 20 (see FIG. 2). Hence, a plurality of multifunctional package containers 10 can be more easily stacked and/or folded and ready to use.

The body section 20 of the multifunctional packaging container 10 is generally defined by parallel folding lines 22a and 22b, and parallel folding lines 22e and 22f. Parallel folding lines 22a and 22b are typically at right angles to parallel folding lines 22e and 22f thereby creating a generally rectangular shape of the body section 20 when the container 10 is in a flattened configuration. Folding line 22a runs along and defines the edges of first side wall 30a, and folding line 22b runs along and defines the edges of second side wall 30b. Similarly, folding line 22e runs along and defines the edge of the handle first portion 40a, and folding line 22f runs along and defines the edge of the handle second portion 40b. Moreover, folding line 22e and folding line 22f define the edges of the container opening that can be varied in area by the user. In use, as the body section 20 is squeezed or closed, folding line 22e and folding line 22f are drawn nearer to each other such that the container opening gets smaller until the parallel folding lines 22e, 22f meet or touch and the container opening closes. Hence, the container 10 has been basically transformed into a closed configuration by the user.

The body section 20 as well as the first and second side walls 30a, 30b are generally divided into two equal portions by a center folding line 22c. On the body section 20, the center folding line 22c typically defines two equally sized body portions, body portion 23 and body portion 24. The center folding line 22c is typically initially folded or creased in an opposite direction as the direction for which the container 10 will be closed while in operation. This is illustrated with reference to FIG. 4 where the container 10 is being folded in an opposite direction than when the container is being used to scoop an item and/or being closed (i.e., when the edges defined by folding line 22e and 22f are brought proximal each other to touch or nearly touch). If the container 10 is basically folded in half, an outer or exterior surface of body portion 23 touches an outer or exterior surface of body portion 24. This method of folding the center folding line 22c can impart at least some bias or biasing fold for the operation of the container 10.

Next, the operation of the plurality of folding lines 34 and line segments will be discussed in detail. Similarly, the plurality of folding lines 34 can be arranged to impart at least some bias or a biasing fold for the operation of the container 10. The arrangement of the plurality of folding lines 34 and line segments on the body section 20 of the container 10 creates a basic biasing or spring tensioning mechanism when gripping and squeezing the container 10 (see FIGS. 6 and 7, for example). However, the plurality of folding lines 34 also helps to define the shape of the body section 20. In general, one or more fold line arrangements are employed within the body section 20 utilizing at least a portion of the folding lines 34 and line segments. It is pertinent to note that the folding lines 34 may include embossing, debossing, perforating and/or scoring, or the like to aid in the folding function thereof. In the figures, the folding lines 34 (as well as some of the other similar lines) are illustrated to indicate whether the line or line segment is embossed/debossed (shown as a dashed line) or scored (shown as a solid line). Of course, as would be apparent to one of ordinary skill in the art, some of the lines designated as scored and some of the lines designated as embossed/debossed need not be configured in certain variations and alternative embodiments of the multifunctional packaging container as that which is illustrated in the figures.

As illustrated in FIG. 1, several versions of the one or more fold line arrangements are included on the body portion 23 and body portion 24. A first fold line arrangement on body portion 23 proximal the center folding line 22c can include a first line segment 34a and a second line segment 34b being generally in line with each other (meaning if either were extended they would touch) and having an area between them. The area between them can include: angled or oblique folding lines 34c and 34f proximal an end of the first line segment 34a; angled or oblique folding lines 34e and 34h proximal an end of the second line segment 34b; and inner line segments 34d, 34j, and 34g generally connecting the ends of angled or oblique folding lines and running in the same direction as the first and second line segments 34a, 34b, but not in a manner that would connect the first and second line segments 34a, 34b.

A second fold line arrangement on body portion 23 distal the center folding line 22c can include a first line segment 34m and a second line segment 34n being generally in line with each other and having an area between them. The area between them can include: angled or oblique folding lines 34p and 34s proximal an end of the first line segment 34m; angled or oblique folding lines 34r and 34t proximal an end of the second line segment 34n; and inner line segment 34q generally connecting the ends of angled or oblique folding lines 34p and 34r and running in the same direction as the first and second line segments 34m, 34n, but not in a manner that would connect the first and second line segments 34b, 34n. Note that the ends of angled or oblique folding lines 34s and 34t are also basically connected by a portion of the folding line 22e. As can be seen in FIG. 1, the first and second line arrangements can also exist on the body portion 24 in a relatively symmetric placement as those on body portion 23 with respect to the center fold line 22c.

However, it is to be appreciated that the one or more fold line arrangements disposed on the body section 20 may only comprise a small subset of the plurality folding lines 34 and line segments described above. For example, one version of a fold line arrangement may include only a first line segment 34a and a second line segment 34b being generally in line with each other and having no other line segments in the area between them. In some implementations of the body section 20, there may only be the center fold line 22c, a first fold line arrangement disposed on body portion 23 including only the first line segment 34a and the second line segment 34b being generally in line with each other and having no other line segments in the area between them; and a second fold line arrangement disposed on body portion 24 including only the first line segment 34a and the second line segment 34b being generally in line with each other and having no other line segments in the area between them.

Another version of a fold line arrangement may include a first line segment 34a and a second line segment 34b being generally in line with each other and having an area between them. The area between them can include: angled or oblique folding lines 34c and 34f proximal an end of the first line segment 34a; angled or oblique folding lines 34e and 34h proximal an end of the second line segment 34b; inner line segment 34d generally connecting the ends of angled or oblique folding lines 34c and 34e and running in the same direction as the first and second line segments 34a, 34b, but not in a manner that would connect the first and second line segments 34a, 34b; and inner line segment 34g generally connecting the ends of angled or oblique folding lines 34c and 34e and running in the same direction as the first and second line segments 34a, 34b, but not in a manner that would connect the first and second line segments 34a, 34b. As will be apparent to one of skill in the art having the benefit of this disclosure, many other combination of straight, parallel, and angled/oblique line segments can be configured to create the one or more fold line arrangements on the body section 20 and are contemplated in this disclosure.

Figure 8:
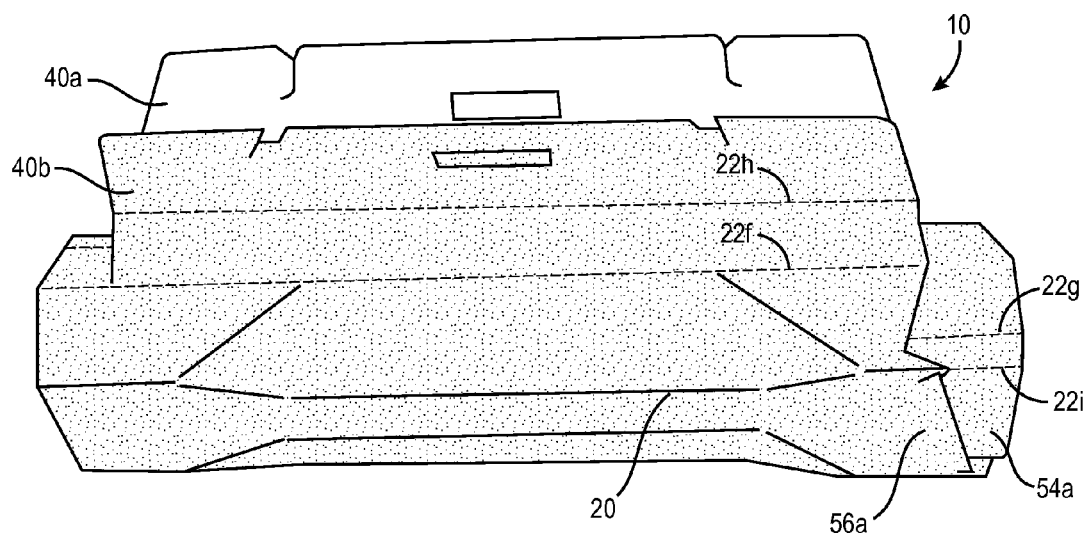
FIG. 8 is a front perspective view of a multifunctional packaging container in a closed configuration according to an embodiment.
Figure 9:
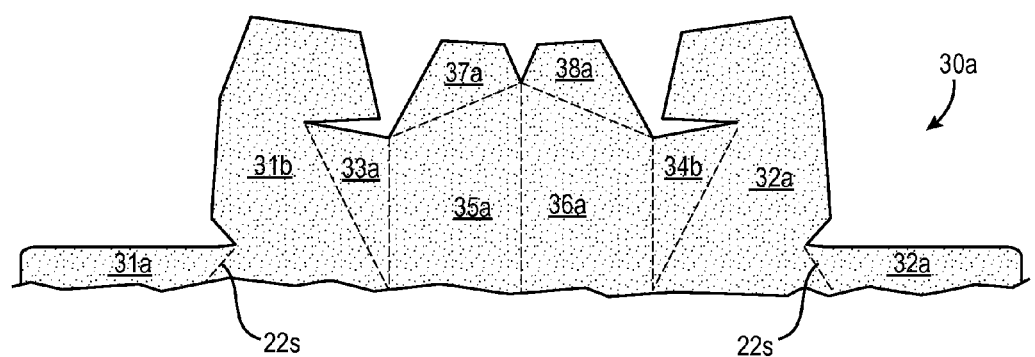
FIG. 9 is a close-up side perspective view of a side wall of a multifunctional packaging container according to an embodiment.

The body portion 20 also typically comprises an insertion tab 56a on body portion 24 and an insertion tab 56b on body portion 23. The insertion tabs 56a, 56b typically have an aperture portion (shown as a semicircle on the FIG. 1) and a movable tab portion (shown as a generally rectangular portion on FIG. 1 that can be slightly folded out when in use). The insertion tabs 56a, 56b are a portion of the one or more securing mechanisms of the container 10. In operation, insertion tab 56a is aligned on top of deboss mark 39b when folding line 22b has been folded. Then, tab portion 54a can be easily inserted into a cavity created by insertion tab 56a and deboss mark 39b in order to seal or lock the container 10. Similarly, insertion tab 56b is aligned on top of deboss mark 39a when folding line 22a has been folded. Then, tab portion 54b can be easily inserted into a cavity created by insertion tab 56b and deboss mark 39a in order to seal or lock the container 10. Additionally, tab portion 54a can have one or more folding lines 22*j*, 22*g*, and tab portion 54*b* can have one or more folding lines 22*h*, 22*k* in order to aid the tab portions in curving around the curvature of the body section 20 and being inserted into their respective insertion tabs. With the two securing mechanisms proximal each end of the container 10, the contents therein can be safely secured. FIG. 8 illustrates a front perspective view of the container 10 in a closed configuration with tab portion 54*a* inserted and secured into insertion tab 56*a*. It is pertinent to note that other securing mechanisms are contemplated such as, but not limited to, mating sections of hook and loop fasteners removably coupled to the handle assembly, side walls, or body section to seal or lock the container 10 in a closed configuration.

One or more attachment points 25 also can be included on the body portions 23, 24. For embodiments of the container 10 using paperboard or the like, the attachment points 25 are typically glue spots or some other adhesive. However, the attachment points 25 can also include, but are not limited to, snap fasteners and hook and loop fasteners whereby the a mate of the snap fastener or hook and loop fastener can be disposed on end portions 31*a* and 32*a* of the first side wall 30*a*, and end portions 31*b* and 32*b* of the second side wall 30*b*.

Still referring to FIG. 1, the handle assembly of the container 10 is illustrated. The handle assembly is comprised of the handle first portion 40*a* and the handle second portion 40*b*. The handle first portion 40*a* typically includes a first portion 42*a* and a second portion 44*a* separated by folding line 22*g*. There is typically an aperture 46*a* through the handle first portion 40*a*. The handle first portion 40*a* may include one or more alignment deboss marks 49*a*. Additionally, one or more notch and incision cuts 47*a* may be included along a top edge of the handle first portion 40*a*. In a similarly generally symmetric fashion, the handle second portion 40*b* typically includes a first portion 42*b* and a second portion 44*b* separated by folding line 22*h*. There is typically an aperture 46*b* through the handle second portion 40*b*. The handle second portion 40*b* may include one or more alignment emboss marks 49*b*. Additionally, one or more notch and incision cuts 47*b* may be included along a top edge of the handle second portion 40*b*.

Cut lines 14*b* are typically included in some embodiments to separate the tab portions 54*a*, 54*b* from their respective handle portions. In some implementations, the cut lines 14*b* may have a one or more small perforation between the of the handle to hold them flat before being cut for use, for example, when the container 10 is being mailed, in a storage of dispensing container, or when integrated into a side of a larger box or like container.

In use, the handle first portion 40*a* and the handle second portion 40*b* generally align and come together to form the handle assembly upon closing the container 10. The one or more alignment deboss marks 49*a* and the one or more alignment emboss marks 49*b* basically mate together to aid in alignment of the handle assembly. Additionally, the one or more notch and incision cuts on both the handle first portion 40*a* and the handle second portion 40*b* are adapted to interlock and hold the handle portions together. The one or more notch and incision cuts 47*a* of the handle first portion 40*a* can have a slightly arcuate incision whereas the one or more notch and incision cuts 47*b* of the handle second portion 40*b* can have a more straight angular incision thereby aiding in the interlocking of the two handle portions.

Moreover, the apertures 46*a*, 46*b* of the two portions substantially align when the container is in the closed configuration allowing an apparatus such as, but not limited to, a clip (not shown) may be used to more tightly secure closure of the container 10. The clip can include two portions to place a force against the outer surfaces of the handle first portion 40*a* and handle second portion 40*b*, and a member that can go through the apertures 46*a*, 46*b* thereby further securing and aligning the container 10. Then, a lanyard or like device can be connected to the clip and used to carry the container 10. For example, in one exemplary method of using the container 10, after the user has used the container 10 to pick up pet waste and secured it the container 10, the clip can be removably coupled to the handle assembly via the apertures 46*a*, 46*b*. The clip can then be removably coupled to the lanyard and the lanyard can then be held and carried by the user or another end of the lanyard can be removably coupled to the dog's leash or collar for transporting of the container 10.

Next, the first and second side walls 30*a*, 30*b* will be described in detail. Referring primarily to FIG. 1 along with FIGS. 5, 6 and 9, the first wall 30*a* includes end portion 31*a* and end portion 32*a*. End portion 31*a* has a rectangular section proximal folding line 22*e* and folding line 22*s*. End portion 32*a* has a rectangular section proximal folding line 22*f* and folding line 22*s*. These sections create a baffle or flange for a top portion of the side wall proximal the closure created by folding line 22*e* and folding line 22*f* when the container is in the closed configuration. Another section of end portion 31*a* connects to attachment point 25 on the body section 20 and basically acts as an anchor point for side wall 30*a*. End portion 31*a* can also include deboss mark 39*a*. Similarly, another section of end portion 32*a* connects to attachment point 25 on the body section 20 and basically acts as an anchor point for side wall 30*a*. Side wall 30*a* also includes folding portion 33*a* and folding portion 34*a* on opposite sides of the center folding line 22*c*. Folding portion 33*a* is separated from a portion of end portion 31*a* via cut 14*a* and folding portion 34*a* is separated from a portion of end portion 31*a* via cut 14*a*. Folding portion 33*a* flattens against end portion 31*a* with the aid of folding line 22*m* and folding portion 34*a* flattens against end portion 32*a* folding line 22*m* when the container 10 is in a closed configuration. Side portion 35*a* and side portion 36*a* are directly on opposite sides of the center folding line 22*c*. Side portion 35*a* abuts folding portion 33*a* with folding line 22*p* and abuts flange portion 37*a* with folding line 22*r*. Side portion 36*a* abuts folding portion 34*a* with folding line 22*m* and abuts flange portion 38*a* with folding line 22*r*.

Figure 5:
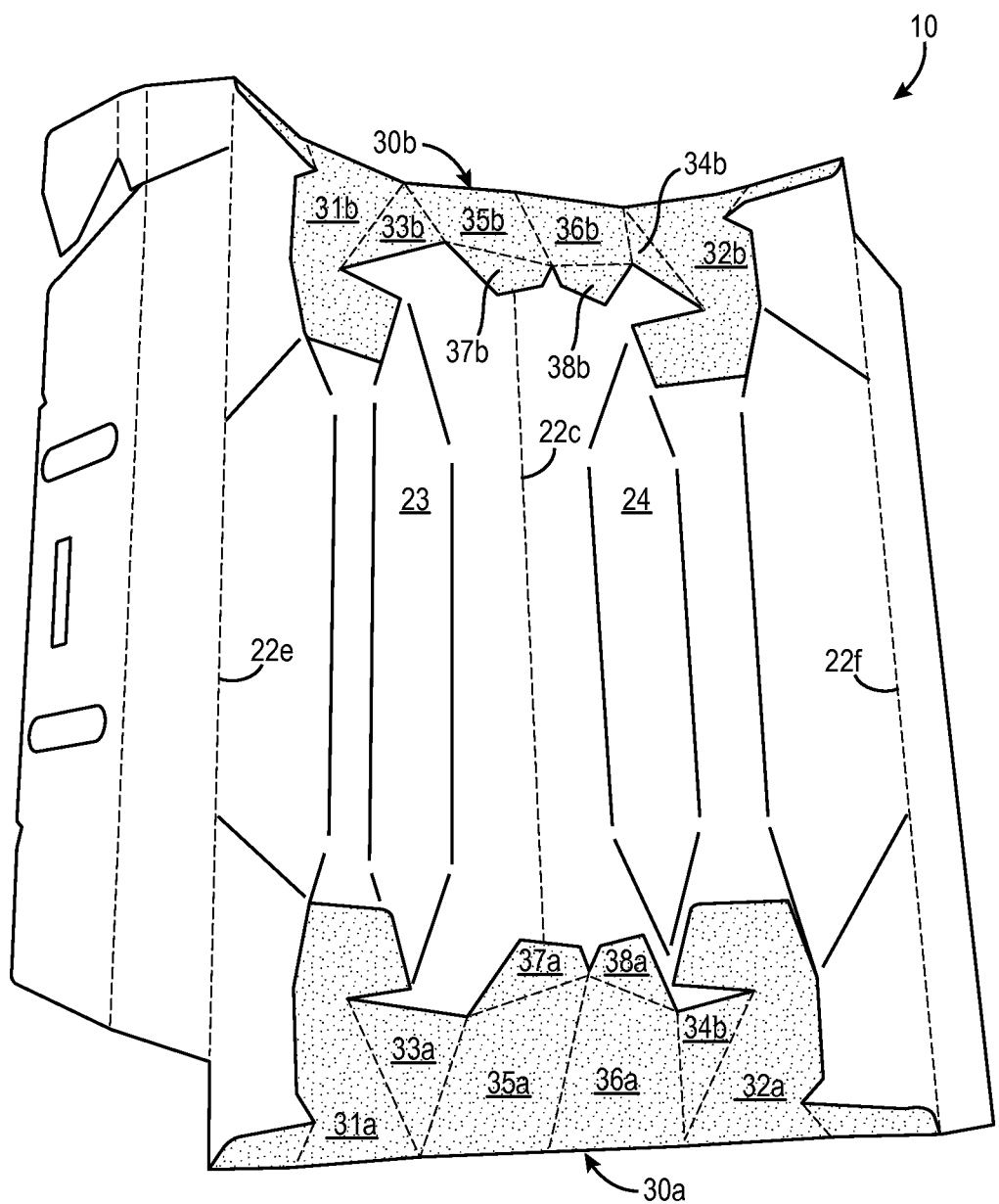
FIG. 5 is an overhead perspective view of a multifunctional packaging container as it begins a transition from a flattened configuration to a closed configuration according to an embodiment.

In use, during the process of squeezing or closing the container 10, the side portions 35*a*, 36*a* will raise from a generally flat position against the body section 20 to a generally orthogonal position with the body section 20. See FIG. 5 showing an overhead perspective view of the container 10 as it begins the transition from the flattened configuration to the closed configuration according to an embodiment. Additionally, the flange portions 37*a*, 38*a* will be guided inwardly by at least one of the rectangular sections of the end portions 31*a*, 32*a* and a top area proximal edge folding lines 22*e*, 22*f* when the container 10 is squeezed or being closed. These flange portions 37*a*, 38*a* can be pre-cut and pre-fold thereby reinforcing the substance and odor sealing aspects of the container 10.

The second side wall 30*b* includes end portion 31*b* and end portion 32*b*. End portion 31*b* has a rectangular section proximal folding line 22*e* and folding line 22*s*. End portion 32*b* has a rectangular section proximal folding line 22*f* and folding line 22*s*. These sections create a baffle or a flange for a top portion of the side wall proximal the closure created by folding line 22*e* and folding line 22*f* when the container is in a closed configuration. Another section of end portion 31*b* connects to attachment point 25 on the body section 20 and basically acts as an anchor point for side wall 30*b*. Similarly, another section of end portion 32*b* connects to attachment point 25 on the body section 20 and basically acts as an anchor point for side wall 30*b*. End portion 32*b* can also include deboss mark 39*b*. Side wall 30*b* also includes folding portion 33*b* and folding portion 34*b* on opposite sides of the center folding line 22*c*. Folding portion 33*b* is separated from a portion of end portion 31*b* via cut line 14*a* and folding portion 34*b* is separated from a portion of end portion 31*b* via cut line 14*a*. Folding portion 33*b* flattens against end portion 31*b* with the aid of folding line 22*m* and folding portion 34*b* flattens against end portion 32*b* folding line 22*m* when the container 10 is in a closed configuration. Side portion 35*b* and side portion 36*b* are directly on opposite sides of the center folding line 22*c*. Side portion 35*b* abuts folding portion 33*b* with folding line 22*p* and abuts flange portion 37*b* with folding line 22*r*. Side portion 36*b* abuts folding portion 34*b* with folding line 22*m* and abuts flange portion 38*b* with folding line 22*r*.

In use, during the process of squeezing or closing the container 10, the side portions 35*b*, 36*b* will raise from a generally flat position against the body section 20 to a generally orthogonal position with the body section 20. Additionally, the flange portions 37*b*, 38*b* will be guided inwardly by at least one of the rectangular sections of the end portions 31*b*, 32*b* and a top area proximal edge folding lines 22*e*, 22*f* when the container 10 is squeezed or being closed. As can be seen for the side perspective of FIG. 6, as the container 10 is being squeezed or closed by a user's hand 90*a* side portion 35*b* and side portion 36*b* comprise the majority of the wall barrier for the second side wall 30*a* when the container 10 is brought to the closed configuration.

As described and illustrated, the multifunctional packaging container 10 comprises a body section 20 having a generally flat rectangular shape when in the flattened configuration. However, the container transforms into a generally elongated cylindrical polygon or pentagon-like shape when in the closed configuration. The shape of the container 10 is a generally cylindrical polygon or pentagon-like shape in the closed configuration because a portion of bottom edges of body section 20 distal the side walls 30*a*, 30*b* while in the closed configuration are basically flattened out by the first and second fold line arrangements. Hence, a portion of the exterior of the body section 20 may include a more rounded surface having seven or more elongated substantially flat surface portions thereby creating an ergonomic and smooth elongated surface formation for the container 10. The generally elongated cylindrical polygon or pentagon-like shape can be best seen with reference to FIGS. 6, 8, and 9. The ends of the container 10 proximal the first and second side walls 30*a*, 30*b* have more of the pentagon-like shape. The pentagon-like shape on the end of the container 10 having the first side wall 30 is basically the planar area defined by side portion 35*a* and side portion 36*a*. Similarly, the pentagon-like shape on the end of the container 10 having the second side wall 30*b* is basically the planar area defined by side portion 35*b* and side portion 36*b*. However, embodiments including various other shapes such as, but not limited to, other polygons and even rounded shapes having arcuate line segments are contemplated in this disclosure.

The body section 20 of the container 10 and biasing nature of the various sections and portions thereof are adapted to contract and/or engage inwardly while the first and second side walls 30*a*, 30*b* are adapted to simultaneously expand outwardly and orthogonal to the body section 20 to form the generally elongated cylindrical polygon or pentagon-like container while the user squeezes close the container. In the closed configuration, the internal cavity of the container 10 is basically fully enclosed (not airtight, but significantly enclosed to prevent any leaking of the contents therein) by the arrangement and configuration of the body section 20 and sidewalls 30*a*, 30*b*.

Figure 2:
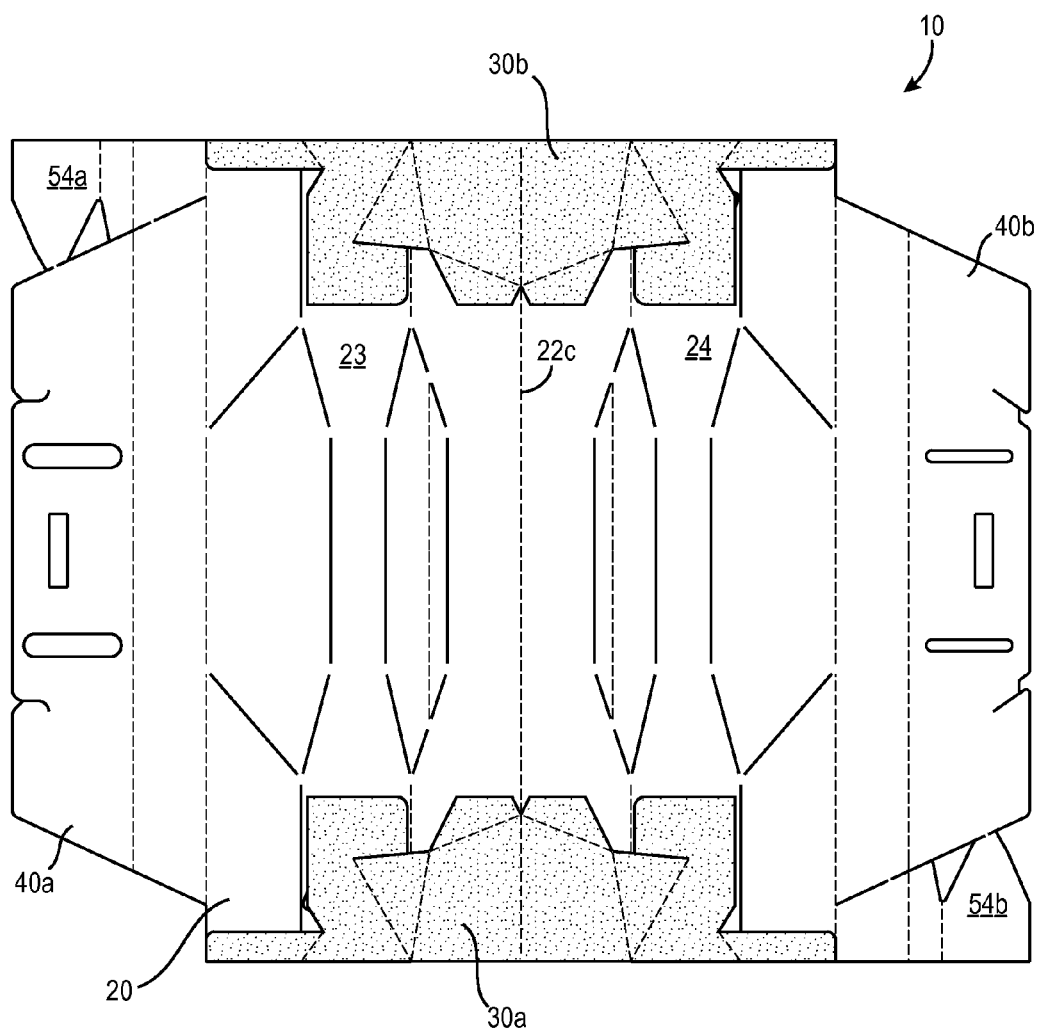
FIG. 2 is a plan view of an inside surface of a multifunctional packaging container with its side walls folded and attached to a body section according to an embodiment.
Figure 3:
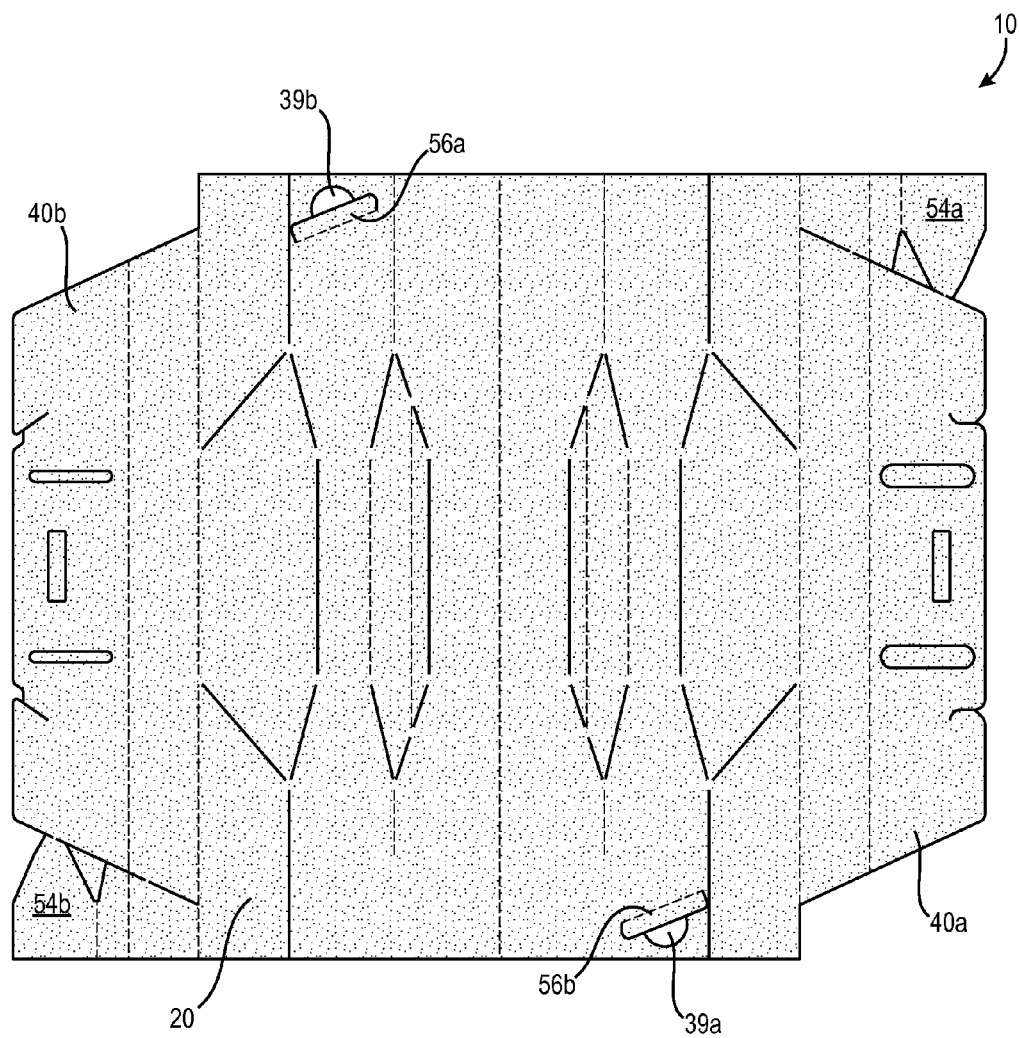
FIG. 3 is a plan view of an outside surface of a multifunctional packaging container with its side walls folded and attached to a body section according to an embodiment.
Figure 4:
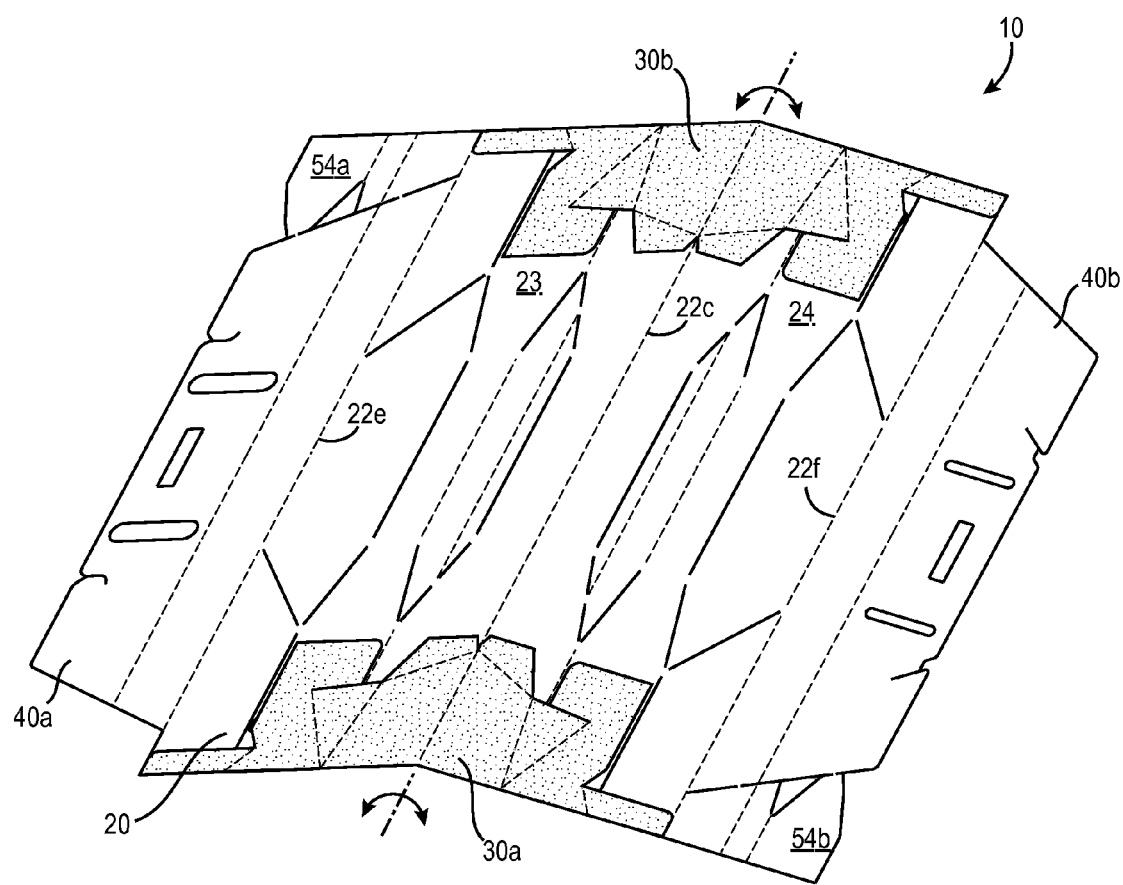
FIG. 4 is a perspective view of a multifunctional packaging container being folded along a center folding line according to an embodiment.

Referring specifically to FIG. 2, the container 10 is shown in a flattened configuration with the first side wall 30*a* folded and attached to the body section 20 and the second side wall 30*b* folded and attached to the body section 20. FIG. 2 illustrates what would be the interior surface of the container 10 with the exception a portion of the first and second side walls 30*a*, 30*b*, which would pop-up and become orthogonal with relation to the body section 20 and be part of the exterior surface. Note that the first and second side walls 30*a*, 30*b* are shaded indicating the back or exterior surface of these sidewalls from FIG. 1. Conversely, FIG. 3 show exterior or outer side of the container 10 in the flattened configuration with the first side wall 30*a* folded and attached to the body section 20 and the second side wall 30*b* folded and attached to the body section 20. The view illustrated in FIG. 3 is basically a view of the container 10 in the flattened configuration flipped over showing the exterior side of the container 10. Note that the first and second side walls 30*a*, 30*b* are not illustrated in FIG. 3 as they are tucked under in body section 20 in this view. Additionally, the entire side illustrated is shaded indicating the back or exterior surface of the container 10 from FIG. 2.

Figure 6:
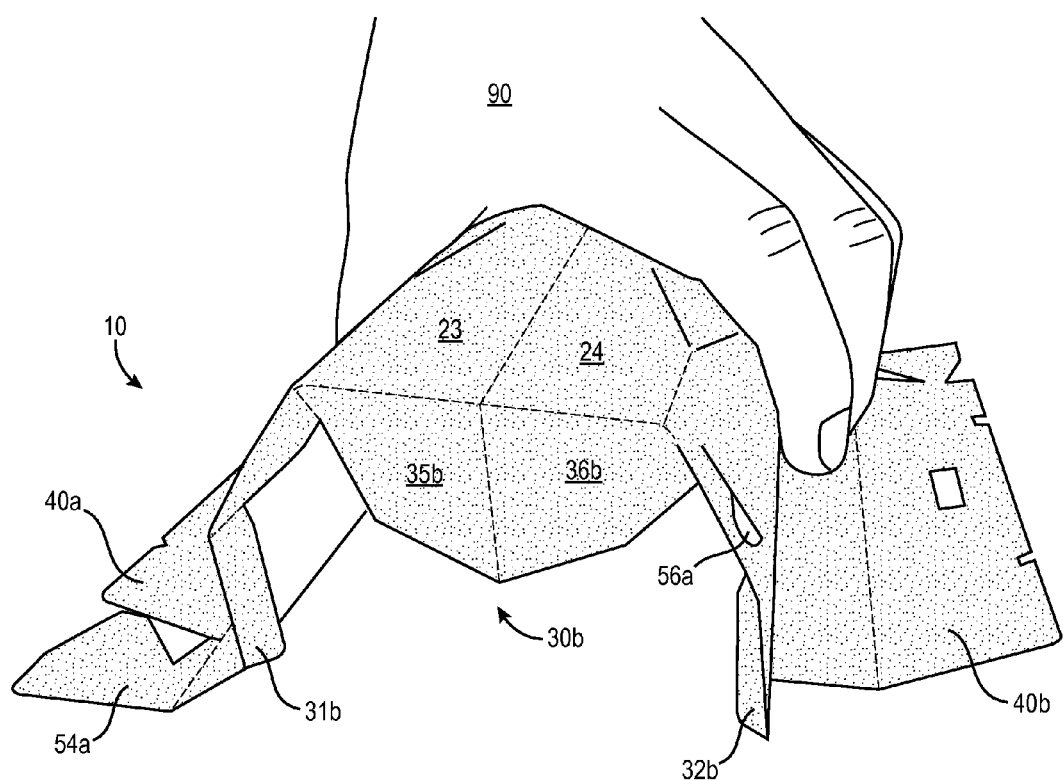
FIG. 6 is a side perspective view of a multifunctional packaging container whereby a user is in the process of picking up an item and further transitioning the container into a closed configuration an embodiment.
Figure 7:
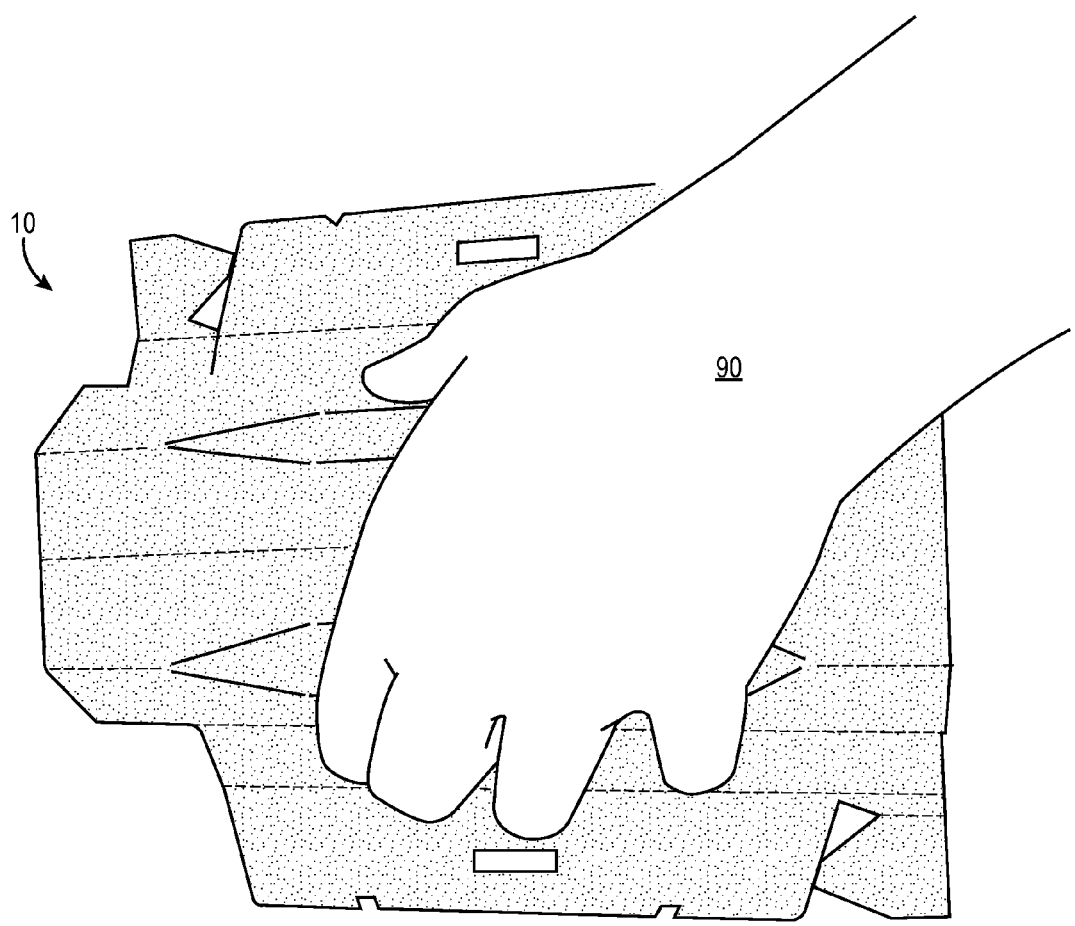
FIG. 7 is a top perspective view of a multifunctional packaging container being placed over an item prior to closing the container according to an embodiment.

It is pertinent to note that the container 10 may also include a sealer, barrier or barrier layer to prevent any items such as, but not limited to, pet waste, from contacting the user's hand 90 when holding the multifunctional packaging container 10 (see FIGS. 6 & 7 for example). Moreover, the container 10 can be coated with water resistance finishing material thereby assuring a moisture proof seal against deformation or leakage of pet waste or contents therein. Additionally, the container 10 may be comprised of a biodegradable material such as, but not limited to, a biodegradable paperboard. It is also pertinent to note that areas of the container 10 can include printed and embossed sections in a variety of shapes and forms adapted to add structural strength, enhance performance, and render aesthetic value.

It is to be appreciated that the container 10 can be manufactured from a single bank of paperboard or like material. In some embodiments, the container 10 can be completely pre-formed, pre-cut, pre-folded and pre-glued into a ready-to-use condition by a manufacturer or consumable good supplier. Then, a user can easily and quickly finish the folding before using the container 10 thereby lowering the manufacturing and assembly costs of the producer. Alternatively, the manufacturer or consumable good supplier could prepare the final folding and pack the goods inside the container 10. Then, the goods can be secured in container 10 (in the closed configuration) before shipping the goods and container 10 to the consumers.

Figure 10:
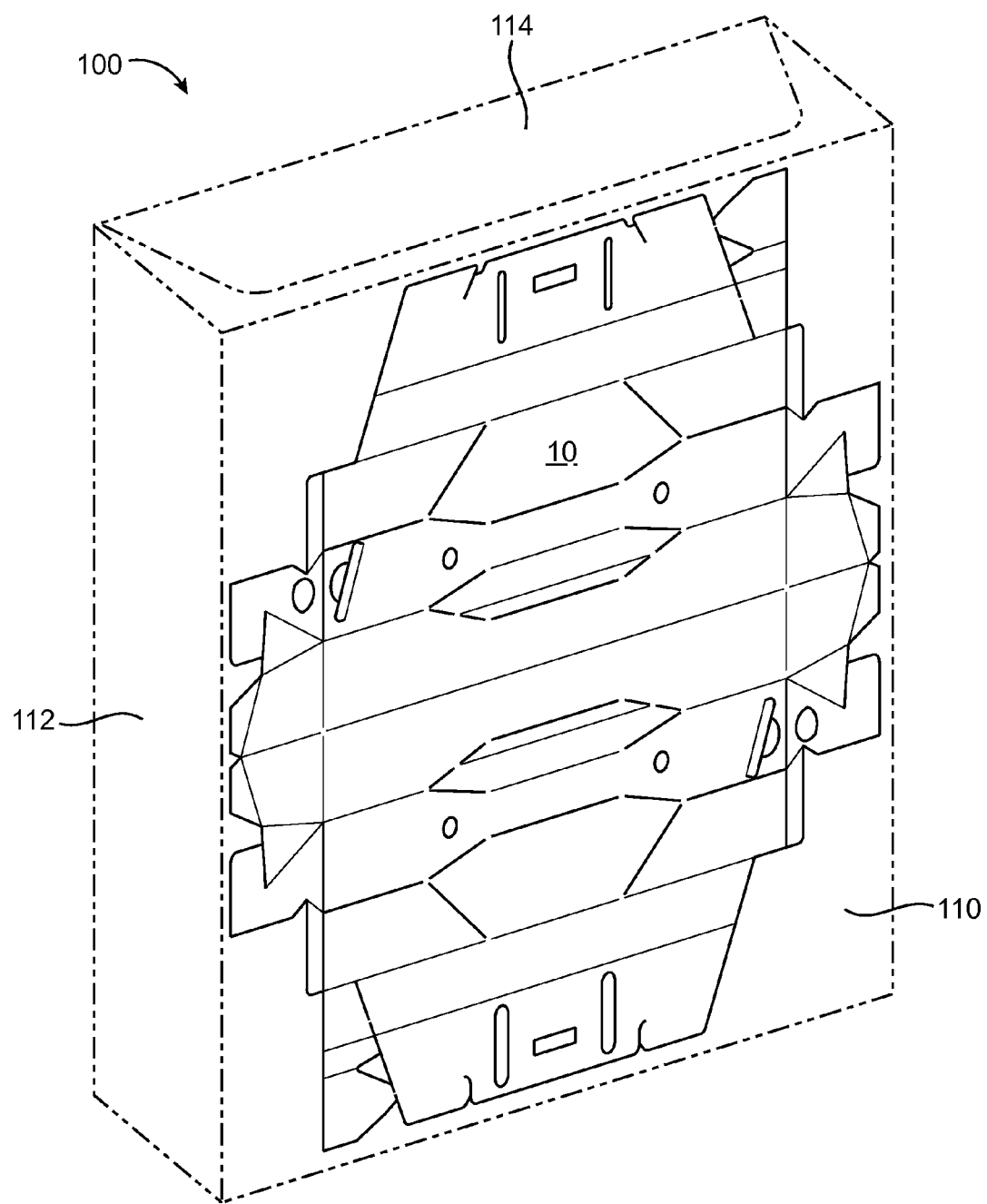
FIG. 10 is a perspective of a box having a multifunctional packaging container integrated into a side according to an embodiment.

FIG. 10 illustrates a combination of a box having a multifunctional packaging container 10 incorporated into a side of the box. Box 100 can include a back panel 110, a side panel 112 and a top panel 114. The box 100 can be any number of box types for storing goods such as, but not limited to, cereal boxes, dog food boxes, dog treat boxes, and like paperboard boxes. The container 10 is in a fully flattened configuration (see FIG. 1) with the side walls extended out (i.e., not attached to the body section as in other implementations). The container 10 can then be integrated into the back panel 110 or any sufficiently sized panel of the box 100. In some implementations, the box 100 will have two or more integrated containers 10 on the plurality of panels comprising the box 100. The two or more integrated containers 10 can be on the front side panel and the back side panel of the box 100. Additionally, if the box 100 is of sufficient size, two or more integrated containers 10 can be on a single panel of the box 100. Moreover, in some embodiments the printing for the integrated containers 10 can be on the inside or interior surface of the panels of the box 100. Thus, the integrated containers 10 would not interfere with the supplier's requirements for the product indicia placement on the outside or exterior surface of the box 100.

Additionally, a support member or like attachment can be applied to the back panel 110, or any panel comprising a container 10 thereon, in order to make the box 100 more structurally solid and provide support for the back panel 110. Typically, the support member will be coupled to at least one portion of the back panel 110 that is not within the area defined by the container 10 thereon. In such an implementation, at least one of the panels (typically a larger panel) of the box 100 are pre-formed and pre-cut with a container 10. The container 10 will typically have a perimeter cut line 12 (see FIG. 1) comprising perforations or the like in order to aid the user in removing the container 10 from the back panel 110. After using the goods in the box 100, the user can remove the fully flattened container 10 from the back panel 110, for instance, and save it for use as a storage compartment or a pet waste scooper. The containers 10 can be either partially or fully configured for immediate use or stored for future use.

Exemplary Methods of Using a Multifunctional Packaging Container

Figure 11:
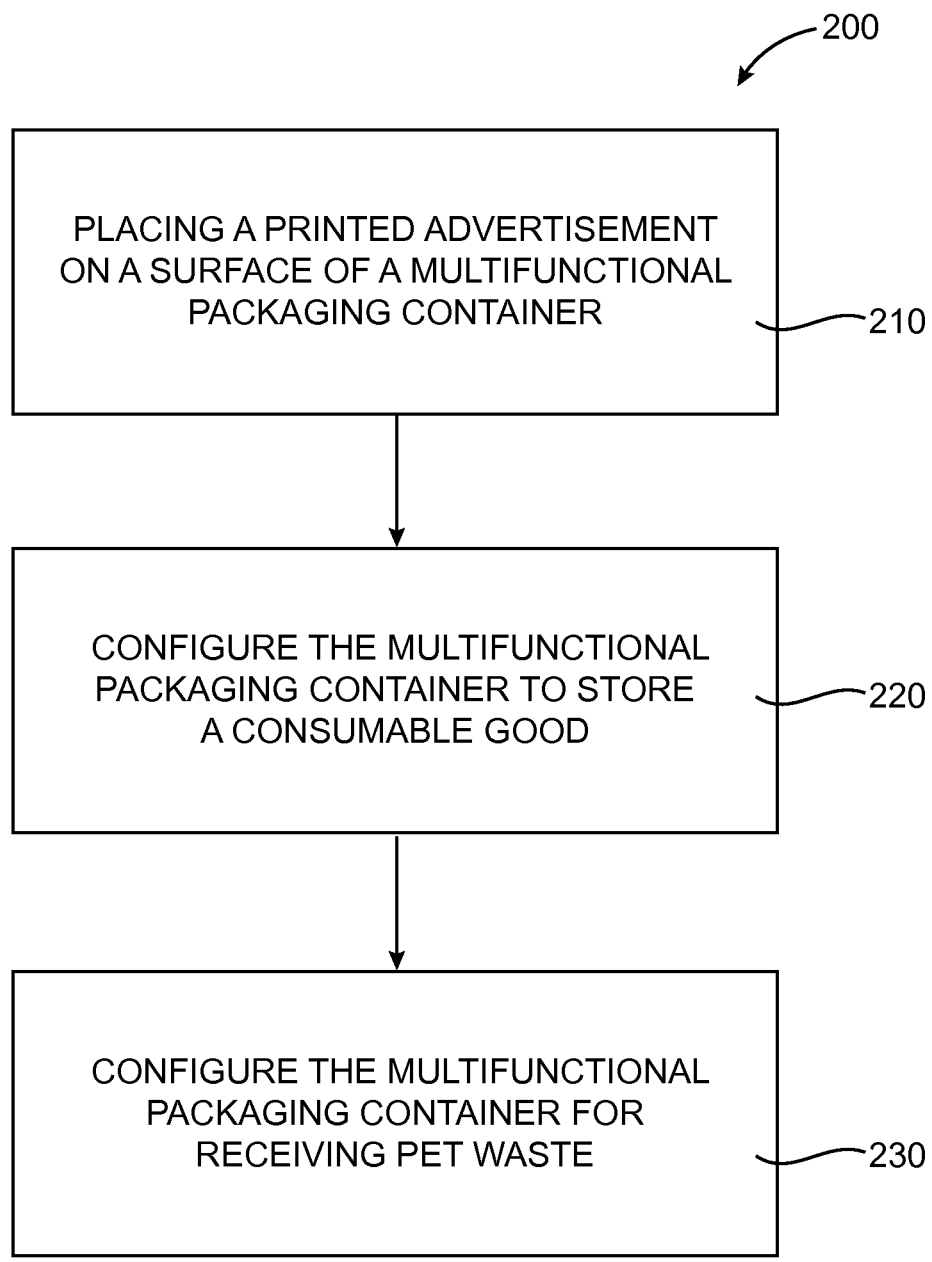
FIG. 11 is a flow chart of an exemplary method of using a multifunctional packaging container according to an embodiment.

Exemplary methods of using embodiments of a multifunctional packaging container are disclosed herein. Embodiments of the multifunctional packaging container 10 as described above can be used in the various methods. An exemplary method of using the multifunctional packaging container is illustrated in the flow chart of FIG. 11. Method 200 discloses a way of advertising with the multifunctional packaging container. A printed advertisement can be placed on a surface of the multifunctional packaging container (operation 210). Placing a printed advertisement on the multifunctional packaging container includes directly printed the advertisement on a surface of the multifunctional packaging container. For example, a coupon code can be printed directly on the multifunctional packaging container with a quick response code. Hence, the quick response code can be easily accessible by smart phones or various electronics viewing devices. Additionally, the multifunctional packaging container can include or be integrated with a pre- cut and/or pre-folded printed advertisement, sales brochure, promotional flyer, or the like. Moreover, a peelable coupon can be included and removably coupled to a surface of the multifunctional packaging container.

Next, the multifunctional packaging container can sold as a packaging container, for example, to store a consumable good (operation 220) such as but not limited to dog food. However, other embodiments of method 200 may include non-consumable goods or items packaged within the multifunctional packaging container. After removing the goods stored therein, the user can use the multifunctional packaging container as a per waste disposal container (operation 230). The multifunctional packaging container can be easily re-folded by the user to a flattened or collapsible configuration whereby it can be used to store other goods or can be used as a disposable pet waste scooper. Alternatively, the multifunctional packaging container can include a printed advertisement and be a mailed piece. Upon receiving the multifunctional packaging container in the mail, the user can configure the multifunctional packaging container for use as either a storage container or disposable pet waste scooper.

When used as a disposable pet waste scooper, the container 10 is placed concavely to cover the pet waste concealing the user's exposure to pet waste while scooping or otherwise disposing the pet waste. See FIG. 7 illustrating a top perspective view of the multifunctional packaging container being placed over an item such. as but not limited to, pet waste prior to closing the container. The user does not receive several of the undesirable aspects of scooping pet waste with a plastic bag such as, but not limited to, the feel and consistency of the pet feces in one's hand, the warmth of the pet feces in one's hand, the transfer of pet feces to one's hand through small holes in the plastic bag, and the sight of the pet feces though a transparent or semitransparent plastic bag. As such, the multifunctional packaging container is adapted to be of a sufficient size to cover pet feces when the pet feces in on the ground before scooping. Hence, several different sizes of the multifunctional packaging container are contemplated for use with different sized dogs or other pets.

Additionally, an exemplary method of making the multifunctional packaging container is disclosed. The method comprises providing a sheet of paperboard. The paperboard is typically made from biodegradable and/or recycled materials, however, other materials are contemplated. Next, the multifunctional packaging container is die cutting around a perimeter shape from the sheet of paperboard. The perimeter shape can be that of perimeter cut line 12 as defined above and illustrated in FIG. 1. The perimeter shape is generally defined from the multifunctional packaging container in a fully flattened configuration. Hence, the first and second side walls 30a, 30b are on the same plane on the paperboard as the body section 20 (see FIG. 1). Next, a plurality of folding lines and line segments can be formed. These are formed on the first and second side walls 30a, 30b and the body section 20 by a one of embossing, debossing, perforating, and scoring for each of the plurality of folding lines and line segments. It is to be understood that each of the various folding lines and line segments may treated in different ways (e.g., embossing, debossing, perforating, or scoring, or the like) to create the multifunctional packaging container.

With reference to FIG. 1, at least one end portion (31a and/or 32a) of the first side wall 30a is attached to a portion (typically attachment point 25) of the body section 20. Next, at least one end portion (31b and/or 32b) of the second side wall 30b is attached to a portion (typically attachment point 25) of the body section 20. Any suitable adhesive or attachment method can be used to attach the end portions. The multifunctional packaging container made by this method will typically look the container 10 illustrated in FIG. 2 and FIG. 3, basically in a flattened configuration. Additional operations can be made to the multifunctional packaging container, such as folding it along the center folding line 22c and/or folding and prepping the various sections and portions.

It is to be appreciated that many other methods and uses are contemplated as would be obvious to one of ordinary skill given the benefit of this disclosure.

Alternative Embodiments and Variations

The various embodiments and variations thereof, illustrated in the accompanying figures and/or described above, are merely exemplary and are not meant to limit the scope of the invention. It is to be appreciated that numerous other variations of the invention have been contemplated, as would be obvious to one of ordinary skill in the art, given the benefit of this disclosure.

For example, an embodiment of the multifunctional package container can be made from a light plastic material having opposing snaps or hook and loop fasteners to connect the sidewalls to the body section. In a similar fashion to reusable origami camping bowls or the like, such an embodiment of the multifunctional package container can be carried or stored in a backpack in a flattened configuration and then assembled and used while in camping or hiking. Hence, the light plastic multifunctional package container can be used to carry fish caught or other items collected during a hike, for instance. Then, the light plastic multifunctional package container could be washed and reused.

Moreover, larger versions of the light plastic multifunctional package container, as well as other embodiments of the multifunctional package container comprised of paperboard, cardboard, or other materials could be used as lunchboxes (disposable or reusable), art and/or paint supply carrying cases, and clothes bags (e.g., for undergarments after a workout) to name only a few exemplary variations.

All variations disclosed in this patent application are intended and contemplated to be within the spirit and scope of the invention.

We claim:

1. A container comprising:
    a body section having a generally flat rectangular shape when in a flattened configuration and a generally elongated cylindrical shape in a closed configuration, the body section including one or more fold line arrangements;
    a first side wall lying generally flat against the body section when in the flattened configuration and having a generally polygon shape orthogonal to the body section when in the closed configuration; and
    a second side wall lying generally flat against the body section when in the flattened configuration and having a generally polygon shape orthogonal to the body section when in the closed configuration;
    wherein each of the one or more biasing fold line arrangements includes a plurality of fold line segments adapted to provide at least some biasing force when the container is transformed from the flattened configuration to the closed configuration by moving a pair of parallel folding line edges defining the container opening proximal each other.

2. The container of claim 1 further comprising a handle assembly.

3. The container of claim 2, wherein the handle assembly comprises a handle first portion coupled to a one of the pair of parallel folding line edges and a handle second portion coupled to another of the pair of parallel folding line edges.

4. The container of claim 3, wherein the handle first portion includes a first aperture and the handle first portion includes a second aperture, the first and second apertures being substantially aligned when the container is in the closed configuration.

5. The container of claim 3, wherein the handle first portion includes one or more notch and incision cuts along a top edge of the handle first portion, and the handle second portion includes one or more notch and incision cuts along a top edge of the handle second portion, the one or more notch and incision cuts on their respective handle portions being adapted to interlock and hold the handle portions together.

6. The container of claim 1 further comprising one or more securing mechanisms.

7. The container of claim 6, wherein at least one of the one or more securing mechanisms includes a tab portion adapted to be removably coupled to an insertion tab when the container is in the closed configuration.

8. The container of claim 1, wherein at least one of the plurality of fold line segments includes a one of embossing, debossing, and scoring along at least a portion thereof.

9. The container of claim 1, wherein at least one of the one or more fold line arrangement includes a first line segment and a second line segment, the first and second line segments being generally in line with each other and having no other line segments in the area between them.

10. The container of claim 1, wherein at least one of the one or more fold line arrangement includes a first line segment and a second line segment, the first and second line segments being generally in line with each other and having an area between them, the area between the first and second line segments including a first pair of angled or oblique folding lines proximal an end of the first line segment, a second pair of angled or oblique folding lines proximal an end of the second line segment, at least one inner line segment generally connecting an end of a one of the first pair of angled or oblique folding lines with a one of a second pair of angled or oblique folding lines, the at least one inner line segment running in the same generally parallel direction as the first and second line segments.

11. The container of claim 1, wherein the body section further comprises a center folding line, the center folding line (i) defining two generally equally sized body portions on the body section, and (ii) being initially folded in an opposite direction as the direction for which the container is rotated around the center folding line when the container opening is being closed.

12. The container of claim 1, wherein the first and second side walls include at least one baffle member covering an edge of the first and second side walls.

13. The container of claim 1, wherein the container is comprised of a biodegradable material.

14. A method of disposing pet waste using the container of claim 1, the method comprising:
    holding the container generally around the exterior side of the body portion;
    placing the container opening over pet waste; and
    closing the container with the pet waste therein.

15. A method of making the container of claim 1, the method comprising:
    providing a sheet of paperboard;
    die cutting a perimeter shape of the container in a fully flattened configuration from the sheet of paperboard;
    forming a plurality of folding lines and line segments by a one of embossing, debossing, perforating, and scoring for each of the plurality of folding lines and line segments;
    attaching at least one end portion of the first side wall to a portion of the body section; and
    attaching at least one end portion of the second side wall to a portion of the body section.

16. A method of disposing pet waste using the container of claim 4, the method further comprising:
    holding the container generally around the exterior side of the body portion;
    placing the container opening over pet waste;
    closing the container with the pet waste therein;
    removably coupling a clip to the handle assembly through both the first aperture of the handle first portion and the second aperture of the handle second portion; and
    removably coupling a lanyard to the clip.

17. The method of disposing pet waste of claim 16 using the container of claim 4, the method further comprising:
    removably coupling the lanyard to a one of a dog collar and a dog leash.

18. A method of advertising using the container of claim 1, the method comprising:
    placing a printed advertisement on a surface of the container of claim 1; and selling the container as a packaging container having goods therein.

19. A combination comprising:

a paperboard box comprising a plurality of panels; and at least one multifunctional packaging container in a fully flattened configuration integrated into at least one of the plurality of panels of the paperboard box, the at least one multifunctional packaging container comprising, a body section having a generally flat rectangular shape when in fully flattened configuration and a generally cylindrical shape in a closed configuration, the body section including one or more fold line arrangements;

a first side wall extending from the body section in the fully flattened configuration, the first side wall including two end portions for attaching the first side wall to the body section whereby the first side wall lies generally flat against the body section when in the flattened configuration and has a generally polygon shape orthogonal to the body section when in the closed configuration; and a second side wall extending from the body section in the fully flattened configuration, the second side wall including two end portions for attaching the second side wall to the body section whereby the second side wall lies generally flat against the body section when in the flattened configuration and has a generally polygon shape orthogonal to the body section when in the closed configuration;

wherein each of the one or more biasing fold line arrangements includes a plurality of fold line segments adapted to provide at least some biasing force when the container is transformed from the flattened configuration to the closed configuration by moving a pair of parallel folding line edges defining the container opening proximal each other.

20. The combination of claim 19, further comprising:

a support member for providing support to the at least one of the plurality of panels, the support member being coupled to at least one portion of the at least one of the plurality of panels that does not include the multifunctional packaging container thereon.

\* \* \* \* \*